(12) United States Patent
Zhang et al.

(10) Patent No.: US 7,270,926 B2
(45) Date of Patent: Sep. 18, 2007

(54) IMAGING MEMBER

(75) Inventors: Lanhui Zhang, Webster, NY (US); Cindy C. Chen, Rochester, NY (US); Nancy Lynn Belknap, Rochester, NY (US); Francisco J. Lopez, Rochester, NY (US); Liang-Bih Lin, Rochester, NY (US); Andronique Ioannidis, Webster, NY (US); Ed J. Radigan, Scottsville, NY (US); John S. Chambers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 358 days.

(21) Appl. No.: 11/012,506

(22) Filed: Dec. 15, 2004

(65) Prior Publication Data

US 2006/0127781 A1 Jun. 15, 2006

(51) Int. Cl.
*G03G 5/06* (2006.01)

(52) U.S. Cl. ..................... 430/59.4; 430/135

(58) Field of Classification Search .............. 430/59.4, 430/135, 134, 78; 524/88
See application file for complete search history.

(56) References Cited

U.S. PATENT DOCUMENTS

| 4,268,033 A | 5/1981 | Fontaine |
| 4,291,110 A | 9/1981 | Lee |
| 4,338,387 A | 7/1982 | Hewitt |
| 4,654,284 A | 3/1987 | Yu et al. |
| 5,418,107 A | 5/1995 | Nealey et al. |
| 5,456,998 A | 10/1995 | Burt et al. |
| 5,459,004 A * | 10/1995 | Daimon et al. ............... 430/78 |
| 5,521,306 A | 5/1996 | Burt et al. |
| 5,681,678 A | 10/1997 | Nealey et al. |
| 5,725,985 A | 3/1998 | Nealey et al. |
| 5,910,384 A * | 6/1999 | Yamasaki et al. .......... 430/59.4 |
| 6,017,666 A | 1/2000 | Nealey et al. |
| 6,447,965 B1 * | 9/2002 | Nakamura et al. ......... 430/59.5 |

\* cited by examiner

*Primary Examiner*—John L Goodrow
(74) *Attorney, Agent, or Firm*—Eugene O. Palazzo; Fay Sharpe LLP

(57) ABSTRACT

A process for preparing a charge generating layer comprising dispersing photoconductive phthalocyanine particles in a polymer matrix, the matrix comprising a polymeric film-forming reaction product of vinyl chloride, vinyl acetate, maleic acid, and hydroxyalkyl acrylate, in a solution of n-butyl acetate and methyl isobutyl ketone. An electrophotographic imaging member is also prepared comprising a charge generating layer prepared according to this process.

16 Claims, 2 Drawing Sheets

IMAGING MEMBER

BACKGROUND

Illustrated herein in various embodiments are electrophotographic imaging members and more specifically, processes for preparing imaging members by forming a dispersion of a charge generating material in a polymer matrix in a solvent system using n-butyl acetate and methyl isobutyl ketone.

In an electrophotographic application such as xerography, a charge retentive surface (i.e., photoconductor, photoreceptor, or imaging surface) is electrostatically charged and exposed to a light pattern of an original image to be reproduced to selectively discharge the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder referred to as "toner." Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. Subsequent to development, excess toner left on the charge retentive surface is cleaned from the surface.

The aforementioned process is known, and useful for light lens copying from an original, and printing applications from electronically generated or stored originals, where a charged surface may be image-wise discharged in a variety of ways. Ion projection devices where a charge is image-wise deposited on a charge retentive substrate operate similarly.

The electrophotographic imaging members may be in the form of plates, drums or flexible belts. These electrophotographic members are usually multilayered photoreceptors that comprise a substrate, a conductive layer, an optional hole blocking layer, an optional adhesive layer, a charge generating layer, and a charge transport layer, an optional overcoating layer and, in some belt embodiments, an anticurl backing layer.

A conventional technique for coating cylindrical or drum shaped photoreceptor substrates involves dipping the substrates in coating baths. The bath used for preparing photoconducting layers is prepared by dispersing photoconductive pigment particles in a solvent solution of a film-forming polymer. However, the choice of pigment particle, polymer, and solvent solution is critical in achieving a high-quality photoconducting layer.

In this regard, some organic photoconductive pigment particles cannot be applied by dip coating to form high quality photoconductive coatings. For example, phthalocyanine pigment particles tend to settle, which necessitates constant stirring to ensure a uniform dispersion. However, stirring can lead to entrapment of air bubbles that are carried over into the final photoconductive coating deposited on a photoreceptor substrate. These bubbles cause defects in final prints due to differences in discharge of the electrically charged photoreceptor between the regions where the bubbles are present and where the bubbles are not present. Thus, for example, the final print will show white areas over the bubbles during discharged area development or dark spots when utilizing charged area development.

Moreover, many pigment particles tend to agglomerate when attempts are made to disperse the pigments in solvent solutions of film-forming polymers. This agglomeration leads to non-uniform photoconductive coatings which in turns lead to other print defects in the final xerographic prints due to non-uniform discharge. These defects can be seen in streaking and charge-deficient spots. The film-forming polymer selected for photoconductive pigment particles in a charge generating layer can adversely affect the particle dispersion uniformity, coating composition rheology, residual voltage after erase and electrophotographic sensitivity. Some polymers can lead to unstable pigment particle dispersions which are unsuitable for dip coating photoreceptors. Thus, for example, when a copolymer reaction product of 86 weight percent vinyl chloride and 14 weight percent vinyl acetate such as VYHH terpolymer from Union Carbide is utilized to disperse hydroxygallium phthalocyanine (OHGaPc) photoconductive particles, an unstable dispersion is obtained. Additionally, a charge generating layer containing this copolymer has poor light sensitivity and gives high residual voltage after erase.

Furthermore, combinations of some polymers can result in unacceptable coating or electrical properties. For example, some polymers are incompatible with each other and cannot form coatings in which the polymers or particles are distributed uniformly throughout the final coating. Similarly, the choice of solvent affects the quality of the dispersion and the ease of the manufacturing process. For example, a polycarbonate binder, poly(4,4'-diphenyl-1,1'-cyclohexane carbonate), dissolved in tetrahydrofuran or toluene results in a non-Newtonian dispersion.

Along this line, these issues are also disclosed in Nealey et al., U.S. Pat. No. 6,017,666; Nealey et al., U.S. Pat. No. 5,681,678; Nealey et al., U.S. Pat. No. 5,725,985; Burt et al., U.S. Pat. No. 5,456,998; and Nealey et al., U.S. Pat. No. 5,418,107, the disclosures of which are totally incorporated herein by reference. While these patents propose the production of a charge generation layer matrix using binders and solvents to enhance photoconductive particle dispersion uniformity, etc., further improvements are still desired.

Thus, there is a need for additional processes and compositions to form a charge generating layer of an imaging member that exhibits enhanced dispersion stability, enhanced charge transport, etc.

SUMMARY OF THE INVENTION

Disclosed herein in various embodiments is a process for forming a charge generating layer which overcomes one or more of the above-noted deficiencies. The process comprises dispersing photoconductive phthalocyanine particles in a polymer matrix, the matrix comprising a polymeric film-forming reaction product of vinyl chloride, vinyl acetate, a carboxylated monomer such as maleic acid, and hydroxyalkyl acrylate, in a solution of n-butyl acetate (NBA) and methyl isobutyl ketone (MIBK). The dispersion is then applied to a substrate to form the charge generating layer of an electrophotographic imaging member. This dispersion is suitable for use as either an organic photoconductive coating (OPC) or an active matrix coating (AMAT).

An electrophotographic imaging member is also provided comprising a substrate, a charge generating layer and a charge transport layer, the charge generating layer prepared by dispersing photoconductive phthalocyanine particles in a polymer matrix, the matrix comprising a polymeric film-forming reaction product of at least vinyl chloride, vinyl acetate, a carboxylated monomer such as maleic acid, and hydroxyalkyl acrylate, in a solution of NBA and MIBK, applying the dispersion to the substrate, and drying it.

These and other non-limiting aspects and/or objects of the exemplary embodiments disclosed herein are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
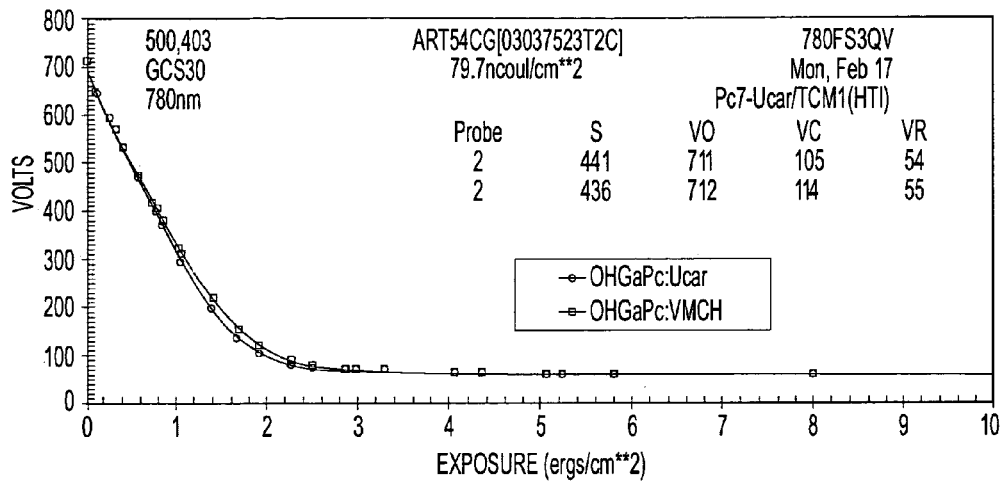
FIG. 1 is a photo-induced discharge curve (PIDC) showing a photoreceptor prepared according to one embodiment of the present disclosure with a pigment:polymer ratio of 60:40 by weight.

Electrophotographic imaging members, i.e. photoreceptors, are well known in the art. Typically, a substrate is provided having an electrically conductive surface. At least one photoconductive layer is then applied to the electrically conductive surface. A charge blocking layer may be optionally applied to the electrically conductive surface prior to the application of the photoconductive layer. If desired, an adhesive layer may be utilized between the charge blocking layer and the photoconductive layer. For multilayered photoreceptors, a charge generation binder layer is usually applied onto the blocking layer and the charge transport layer is formed on the charge generation layer. However, if desired, the charge generation layer may be applied to the charge transport layer.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conductive materials there may be employed various resins known for this purpose including polyesters, polycarbonates, polyamides, polyurethanes, and the like which are rigid or flexible, such as thin webs.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers. Substrates in the shape of a drum or cylinder may comprise a metal, plastic or combinations of metal and plastic of any suitable thickness depending upon the degree of rigidity desired.

The conductive layer may vary in thickness over substantially wide ranges depending on the optical transparency and degree of flexibility desired for the electrophotographic imaging member. Accordingly, for a flexible photoresponsive imaging device, the thickness of the conductive layer may be between about 20 angstrom-units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Where the substrate is metallic, such as a metal drum, the outer surface thereof is normally inherently electrically conductive and a separate electrically conductive layer need not be applied.

After formation of an electrically conductive surface, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. Blocking layers are well known and disclosed, for example in U.S. Pat. Nos. 4,291,110; 4,338,387; 4,268,033; and, 4,291,110. The disclosures of U.S. Pat. Nos. 4,338,387; 4,286,033; and, 4,291,110 are incorporated therein in their entirety. The blocking layer may comprise an oxidized surface which inherently forms on the outer surface of most metal ground plane surfaces when exposed to air. The blocking layer may be applied as a coating by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Drying of the deposited coating may be effected by any suitable conventional technique such as oven drying, infrared radiation drying, air drying and the like. The blocking layer should be continuous and have a thickness of from about 50 nanometers to about 20 micrometers because greater thicknesses may lead to undesirably high residual voltage.

An optional adhesive layer may be applied to the hole blocking layer. Any suitable adhesive layer well known in the art may be utilized. Satisfactory results may be achieved with adhesive layer thicknesses around about 0.05 micrometer to about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infrared radiation drying, air drying and the like.

In the charge generating layer, photoconductive phthalocyanine particles are used as the organic photoconductive pigment particles. These particles are dispersed in a polymer matrix. Suitable phthalocyanine particles include hydroxygallium phthalocyanine, x metal-free phthalocyanine, oxotitanium phthalocyanine, chlorogallium phthalocyanine, and oxovanadium phthalocyanine, and their polymorphs. For example, any suitable hydroxygallium phthalocyanine polymorph may be used in the charge generating layer of the photoreceptor of this disclosure. Hydroxygallium phthalocyanine polymorphs are extensively described in the technical patent literature. For example, hydroxygallium phthalocyanine Type V and other polymorphs are described in U.S. Pat. No. 5,521,306, the entire disclosure of this patent being incorporated herein by reference. Generally, the photoconductive pigment particle size utilized is less than the thickness of the dried charge generating layer and the average particle size is less than about 1 micrometer. Satisfactory results are achieved with an average photoconductive particle size of less than about 0.6 micrometer when the photoconductive coating is applied by dip coating. Preferably, the average photoconductive particle size is less than about 0.4 micrometer. Optimum results are achieved with an average particle size of less than about 0.2 micrometer.

The polymer matrix in the charge generating layer of this disclosure comprises a polymeric film-forming reaction product of vinyl chloride, vinyl acetate, a carboxylated monomer such as maleic acid, and hydroxyalkyl acrylate. These reactants may form a tetrapolymer with the final tetrapolymer containing a spine of carbon atoms. The tetrapolymer chain length can be controlled by varying the reaction temperature and time. For use in the charge generating layer of this invention, this embodiment of the polymer may be formed from a reaction mixture comprising from about 80 percent to about 90 percent by weight vinyl chloride, from about 3 percent to about 15 percent by weight vinyl acetate, from about 6 percent to about 20 percent by weight hydroxyalkyl acrylate and up to about 0.4 percent by weight of a carboxylated monomer such as maleic acid based on the total weight of the reactants for the polymer.

For example, the proportion of maleic acid present in the final polymer matrix can vary from 0 weight percent to about 0.4 weight percent without adversely affecting the quality of the dispersion or the coating quality.

The polymer may be represented by the following formula:

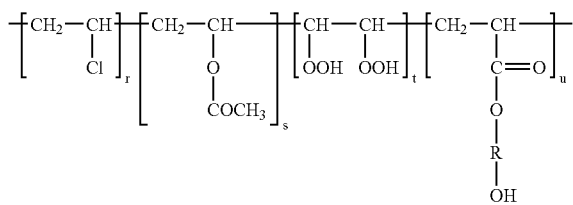

wherein

R is an alkyl group containing 2 to 3 carbon atoms, r is the proportion of the polymer derived from a reaction mixture comprising from about 80 percent to about 90 percent by weight vinyl chloride, s is the proportion of the polymer derived from a reaction mixture comprising from about 3 percent to about 15 percent by weight vinyl acetate, and t is the proportion of the polymer derived from a reaction mixture comprising up to 0.4 percent by weight maleic acid, and u is the proportion of the polymer derived from a reaction mixture comprising from about 6 percent to about 20 percent by weight hydroxyalkyl acrylate based on the total weight of the reactants for the polymer.

The film-forming polymers of this embodiment are commercially available and include, for example, UCARMag 527 resin—a polymeric reaction product of 81 weight percent vinyl chloride, 4 weight percent vinyl acetate, 15 weight percent hydroxyethyl acrylate, and 0.28 weight percent maleic acid having a number average molecular weight of about 35,000 (available from Union Carbide Co.). Satisfactory results may be achieved when the polymer is a solvent soluble polymer having a number average molecular weight of about 35,000. Preferably, these polymers have a number average molecular weight of between about 20,000 and about 50,000. When the molecular weight is below about 20,000, poor film-forming properties and undesirable dispersion characteristics can be encountered.

The alkyl component of the hydroxyalkyl acrylate reactant for the polymer described above contains from 2 to 3 carbon atoms and includes, for example, ethyl, propyl, and the like. A proportion of hydroxyalkyl acrylate reactant of less than about 6 percent may adversely affect the quality of the dispersion. After the film-forming polymer is formed, the polymer preferably comprises a carbonyl hydroxyl copolymer having a hydroxyl content of between about 1 weight percent and about 5 weight percent, based on the total weight of the polymer. Mixtures of the above polymers can also be used in any combination.

The solvent system which may be employed to disperse the photoconductive pigment particles and the film-forming polymer consists of n-butyl acetate (NBA) and methyl isobutyl ketone (MIBK). When the solid pigment particles and polymer are dispersed, the solvent system preferably consists of from about 40 percent to about 95 percent NBA and from about 5 percent to about 60 percent MIBK as measured by the weight of the solvent (i.e., NBA and MIBK; the weights of the pigment and polymer are not included). Most preferably, the solvent system consists of about 65% NBA and about 35% MIBK by weight. This ratio provides high coating quality, more uniform dispersion, and more uniform flow around an obstruction. In addition, this solvent system allows for the charge generating layer to be applied and then dried in ambient conditions.

Figure 3:
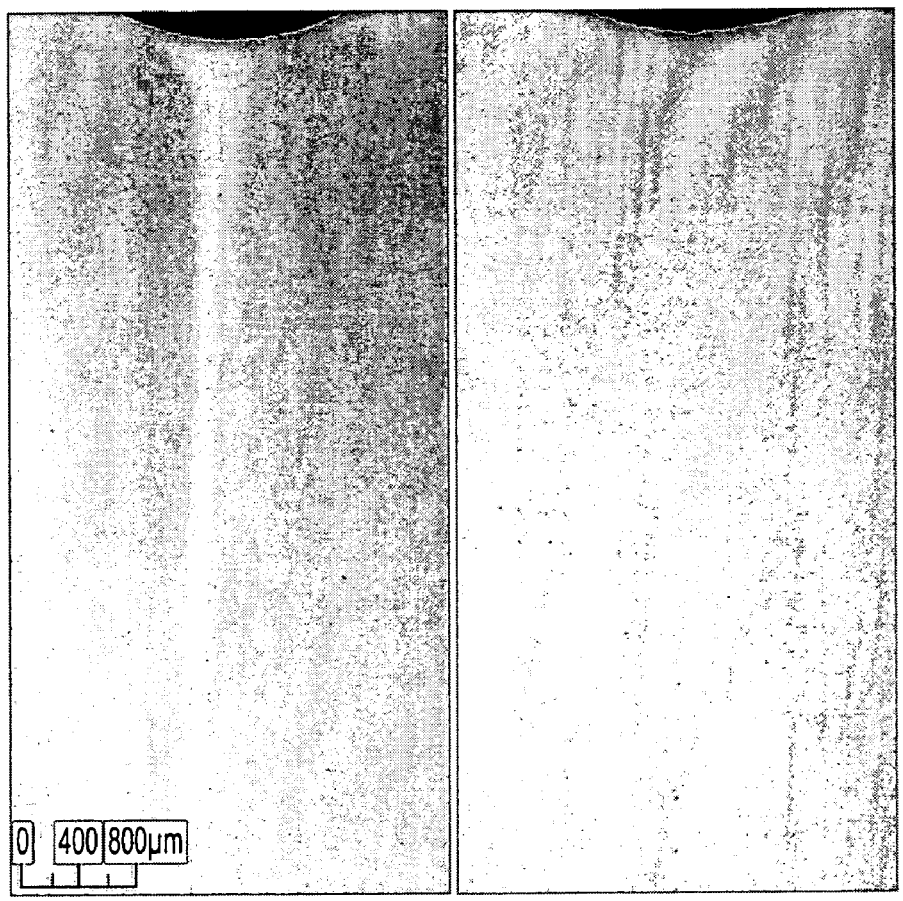
FIG. 3 is a Flow visualization of OHGaPc/U527/NBA dispersion with and without MIBK

The improvement of flow uniformity by the introduction of MIBK as second solvent can be well demonstrated by Flow Visualization Test. In the test of this kind, the said dispersion was allowed to flow through a small gap, said 0.5 mil, where there is an obstruction on the flow path. The gap is formed by holding two pieces of micro slides together with two stainless steel shim strips of given thickness to confine the flow. The flow pattern after obstruction can be one of the criteria for dispersion quality. The ideal dispersion for dip coating should possess no streaks after obstruction. FIG. 3 shows an example how the introduction of MIBK improves the dispersion quality in terms of flow uniformity around an obstruction, where 35% of MIBK greatly diminish the after-obstruction streak.

Any suitable technique may be utilized to disperse the pigment particles and the film-forming polymer into a suitable solvent. Typical dispersion techniques include, for example, ball milling, roll milling, milling in vertical attritors or dynomills, sand milling, and the like which utilize milling media. The solids content of the mixture being milled does not appear critical and can be selected from a wide range of concentrations. Typical milling times using a ball roll mill is between about 4 and about 6 days. If desired, the photoconductive particles with or without film-forming binder may be milled in the absence of a solvent prior to forming the final coating dispersion. Also, a concentrated mixture of photoconductive particles and binder solution may be initially milled and thereafter diluted with additional binder solution for coating mixture preparation purposes. The resulting dispersion may be applied to the adhesive blocking layer, a suitable electrically conductive layer or to a charge transport layer. When used in combination with a charge transport layer, the photoconductive layer may be between the charge transport layer and the substrate or the charge transport layer can be between the photoconductive layer and the substrate.

Any suitable technique may be utilized to apply the coating to the substrate to be coated. Typical coating techniques include dip coating, roll coating, spray coating, rotary atomizers, and the like. The coating techniques may use a wide concentration range of solids. Preferably, the solids content is between about 2 percent by weight and 8 percent by weight based on the total weight of the dispersion. The expression "solids" refers to the pigment particle and binder components of the coating dispersion. These solids concentrations are useful in dip coating, roll, spray coating, and the like. Generally, a more concentrated coating dispersion is preferred for roll coating. Drying of the deposited coating may be effected by any suitable conventional technique such as oven drying, infra red radiation drying, air drying and the like.

Satisfactory results are achieved when the dried photoconductive coating comprises between about 40 percent and about 80 percent by weight of the photoconductive phthalocyanine particles based on the total weight of the dried charge generating layer. When the pigment concentration is less than about 40 percent by weight, particle-to-particle contact is lost resulting in deterioration. Optimum imaging performance is achieved when the charge generating layer comprises about 60 percent by weight of photoconductive particles based on the total weight of the dried charge generating layer with averaged pigment particle size of about 0.2 micron. Since the photoconductor characteristics are affected by the relative amount of pigment per square centimeter coated and particle size, hence with the same pigment particle size a lower pigment loading may be utilized if the dried photoconductive coating layer is thicker. Conversely, higher pigment loadings are desirable where the dried photoconductive layer is to be thinner.

For multilayered photoreceptors comprising a charge generating layer and a charge transport layer, satisfactory results may be achieved with a dried photoconductive layer coating thickness of between about 0.1 micrometer and about 10 micrometers. Preferably, the photoconductive layer thickness is between about 0.2 micrometer and about 1 micrometer. Optimum results are achieved with a generating layer has a thickness of between about 0.2 micrometer and about 0.7 micrometer. However, these thicknesses also depend upon the pigment loading and particle size distribution. Thus, higher pigment loadings permit the use of thinner photoconductive coatings. Thicknesses outside these ranges can be selected providing the objectives of the present invention are achieved.

The active charge transport layer may comprise any suitable activating compound useful as an additive in electrically inactive polymeric materials making these materials electrically active. Any suitable arylamine hole transporter molecules may be utilized in the imaging members of this invention. Typical aryl amines include, for example, N,N'-diphenyl-N,N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl-4,4'-diamine wherein the halo substituent is preferably a chloro substituent. Other specific examples of aryl amines include, 9-9-bis (2-cyanoethyl)-2,7-bis(phenyl-m-tolylamino)fluorene, tritolylamine, N,N'-bis(3,4 dimethylphenyl)-N"(1-biphenyl) amine and the like.

These compounds may be added to polymeric materials which are incapable of supporting the injection of photogenerated holes from the generation material and incapable of allowing the transport of these holes through. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric filmforming resin in which the aromatic amine is compatible.

Any suitable inactive resin binder soluble in methylene chloride, tetrahydrofuran, toluene, and the like and mixtures thereof may be employed in the process of this invention. Typical inactive resin binders soluble in methylene chloride include polycarbonate resin, polyvinylcarbazole, polyester, polyarylate, polyacrylate, polyether, polysulfone, and the like. Molecular weights can vary from about 20,000 to about 150,000.

Any suitable and conventional technique may be utilized to mix and thereafter apply the charge transport layer coating mixture to the coated or uncoated substrate. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

The preferred electrically inactive resin materials are polycarbonate resins having a molecular weight from about 20,000 to about 150,000, more preferably from about 50,000 to about 120,000. The materials most preferred as the electrically inactive resin material are poly(4,4'-diphenyl-1,1'-cyclohexane carbonate with a molecular weight of from about 20,000 to about 40,000, available as PCZ400 from Mitsubishi Chemicals; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G. and a polycarbonate resin having a molecular weight of from about 20,000 to about 50,000 available as Merlon from Mobay Chemical Company. Methylene chloride and tetrahydrofuran solvents are two desirable components of the charge transport layer coating mixture for adequate dissolving of all the components and for its low boiling point.

Optionally, an overcoat layer may also be utilized to improve resistance to abrasion. In some cases an anti-curl back coating may be applied to the side opposite the photoreceptor to provide flatness and/or abrasion resistance where a web configuration photoreceptor is fabricated. These overcoating and anti-curl back coating layers are well known in the art. Overcoatings are continuous and generally have a thickness of less than about 10 micrometers. The thickness of anti-curl backing layers should be sufficient to substantially balance the total forces of the layer or layers on the opposite side of the supporting substrate layer. An example of an anti-curl backing layer is described in U.S. Pat. No. 4,654,284, the entire disclosure of this patent being incorporated herein by reference. A thickness between about 70 and about 160 micrometers is a satisfactory range for flexible photoreceptors.

The following examples describe exemplary embodiments of the present disclosure. These examples are merely illustrative, and in no way limit the present development to the specific materials, conditions or process parameters set forth therein. All parts and percentages are by volume unless otherwise indicated.

EXAMPLE 1

A dispersion was prepared by dissolving a film-forming polymer composition in 100% NBA and then adding hydroxygallium phthalocyanine pigment. The polymer was a polymer reaction product of 81 weight percent vinyl chloride, 4 weight percent vinyl acetate, 0.28 weight percent maleic acid and 15 weight percent hydroxyethyl acrylate by weight of the polymer and having a number average molecular weight of about 35,000 (UCARMag 527, available from Union Carbide Co.). The pigment concentration in the dispersion was 60 percent by weight based on the total solids weight (pigment and polymer). The dispersion was milled in an attritor mill with 1 mm diameter glass beads for 0.5-10 hours. The dispersion was filtered to remove the beads and the solids content adjusted to 4 to 5 percent for coating. The adjustment was done using a mixture of NBA and MIBK such that the final solvent concentration of the dispersion was 65% NBA and 35% MIBK. The average effect diameter of the milled pigment particles was about 0.15-0.3 µm by BI-90plus particle sizer (Brookhaven Instruments, Inc.). The dispersion quality of the coating mixture was examined by measuring its flow pattern uniformity. Next, a cylindrical 40 mm diameter and 310 mm long aluminum drum coated with an undercoat layer that was 4 µm thick and comprised 58 weight percent titanium dioxide, 4 weight percent silicon dioxide, and 4 weight percent Varcum by weight of the dried undercoat layer. The charge generating dispersion was then applied by immersing the aluminum drum into the charge generating dispersion and withdrawing it in a vertical direction along a path parallel to the axis of the drum at a rate of 200 mm/min. The applied charge generation coating was dried at ambient for 10 minutes to form a layer having a thickness of approximately 0.3 µm. This charge generating layer was then dip coated with a charge transport mixture of PCZ400/N,N'-diphenyl-N,N-bis(3-methyl phenyl)-1,1'-biphenyl-4,4'-diamine/THF/monochlorobenzene. The applied charge transport coating was dried by a forced air oven at 135° C. for 40 minutes to form a layer having a thickness of 24 µm. The properties of the charge generating dispersion used to prepare the photoreceptor are summarized in the following table:

| Pigment/ Polymer Ratio Wt. % | % Solids | Viscosity (cps) | Particle Size (µm) | Power Law Fit | Yld Pt. |
|---|---|---|---|---|---|
| 60/40 | 4.5 | 2.2 | 0.15-0.3 | >0.98 | 0 |

The expression "power law" is obtained by plotting log-log graph of the viscosity against the shear rate and measuring the slope of the resulting line. A value that approximates 1 is indicative of a newtonian fluid, i.e. exhibits no change in viscosity with increasing shear. The viscosity values are in centipoise units. The expression "yield point" is defined as the resistance to flow until a certain shear value is applied. A value approximating 0 has no yield point and is desirable for dip coating purposes. This yield point value demonstrates that no yield point is observed in this dispersion.

CONTROL 1

A control photoreceptor was prepared using the procedure of Example 1 except that the film-forming polymer was a polymer reaction product of 86 weight percent vinyl chloride, 13 weight percent vinyl acetate, and 1 weight percent maleic acid by weight of the polymer and having a number average molecular weight of about 27,000 (VMCH, available from Union Carbide Co.).

EXAMPLE 2

A photoreceptor was prepared using the procedure of Example 1 except that the pigment concentration in the dispersion was 35 percent by weight based on the total solids weight (pigment and polymer).

CONTROL 2

A control photoreceptor was prepared using the procedure of Example 2 except that the film-forming polymer was a polymer reaction product of 86 weight percent vinyl chloride, 13 weight percent vinyl acetate, and 1 weight percent maleic acid by weight of the polymer and having a number average molecular weight of about 27,000 (VMCH, available from Union Carbide Co.).

RESULTS

The photoreceptor prepared in Example 1 and its control photoreceptor (CONTROL 1) were electrically tested with a cyclic scanner set to obtain 100 charge-erase cycles immediately followed by an additional 100 cycles, sequenced at 2 charge-erase cycles and 1 charge-expose-erase cycle, wherein the light intensity was incrementally increased with cycling to produce a photo-induced discharge curve (PIDC) from which the photosensitivity was measured. The scanner was equipped with a single wire corotron (5 cm wide) set to deposit 80 nC/cm$^2$ of charge on the surface of the photoreceptor. The photoreceptors were tested in the negative charging mode. The exposure light intensity was incrementally increased by means of regulating a series of neutral density filters and the exposure wavelength was controlled by a band filter at 780±5 nm. The exposure light source was a 1,000 watt xenon arc lamp white light source. The dark discharge of the photoreceptors was measured by monitoring the surface potential for 7 seconds after a single charge cycle of 80 nC/cm$^2$ (without erase). Photosensitivity (dV/dx) was calculated from the initial discharge rate at low exposure intensity, determined to be at about 70% of the initial voltage (about 0 to about 7 ergs/cm$^2$ exposure). The critical voltage, $V_c$, was determined at the point where the generation efficiency was ½. The drum was rotated at a speed of 40 rpm to produce a surface speed of 62.8 mm/sec or a cycle time of 1.5 seconds. The xerographic simulation was carried out in an environmentally controlled dark chamber at ambient conditions (30% relative humidity and 25° C.). To measure the light induced dark discharge rate, the photoreceptor was dark rested for 24 hrs, then a single charge cycle was applied and the resulting voltage decay was measured in the dark. The dark discharge current is identical for the dark rested photoreceptors of Example 1 and Control 1 at this moment. The sample was subsequently exposed to 300 negative charge-erase cycles and on the last charge cycle was allowed to decay in the dark. The light induced dark discharge rate is calculated from the difference between the two dark decay voltage rates. After 300 negative charge-erase cycles, the photoreceptor of Example 1 shows a less dark decay rate of about 2V/s, demonstrating the improved transport capability achieved with the charge generator layer in this invention. The results are summarized in the following table:

| Device | Initial Voltage $V_o$ (V) | Photosensitivity (V · cm$^2$/erg) | Critical Voltage $V_c$ (V) | Residual Voltage $V_r$ (V) | Light Induced Dark Discharge |
|---|---|---|---|---|---|
| Example 1 | 711 | 441 | 105 | 54 | 7.8 V/s |
| Control 1 | 712 | 436 | 114 | 55 | 9.7 V/s |

Figure 2:
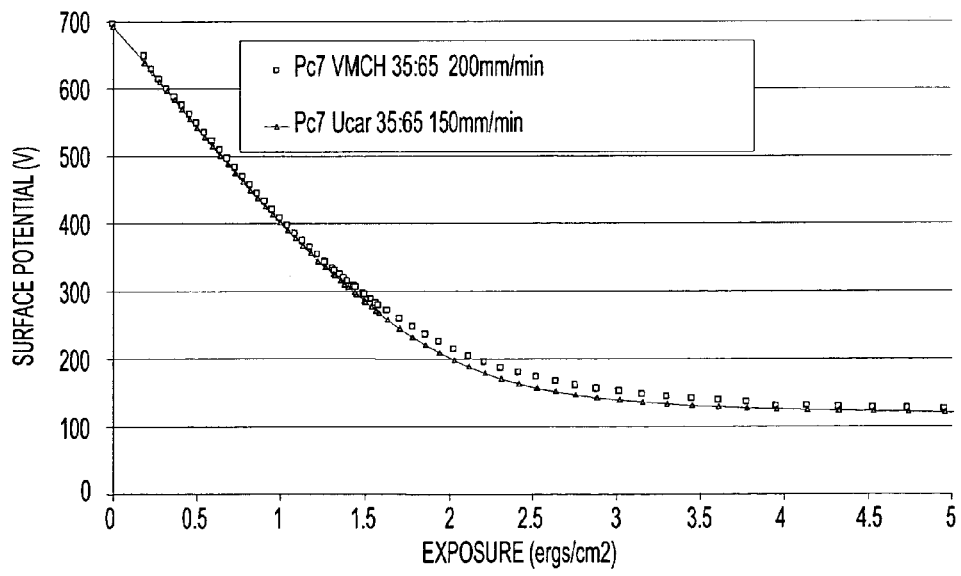
FIG. 2 is a photo-induced discharge curve (PIDC) showing a photoreceptor prepared according to one embodiment of the present disclosure with a pigment:polymer ratio of 35:65 by weight.

The two photoreceptors were of identical thickness and were charged to the same initial voltage, then discharged to the same residual voltage within 1V. The photoreceptor of Example 1 shows a slightly higher photosensitivity, indicating enhanced charge transport within the charge generating layer and at the interfaces of the charge generating layer with other layers. There is a significant difference in the critical voltage, which is a measure of the sharpness of the deviation from the linear portion of the PIDC. In an ideal system, the PIDC is linear to a residual potential point governed by charge mobility limitations present in the system. In a multi-layer photoreceptor device, both the charge transport within each layer and charge injection at their interfaces are critical and govern the transitional region of the curve before a residual potential is reached. The much lower $V_c$ for the photoreceptor of Example 1 demonstrates the superior performance of a charge generating layer prepared according to the present invention. This is shown in FIG. 1, where the two photoreceptors have identical initial slopes, but the photoreceptor of Example 1 shows a sharpening in the knee of the PIDC. The photoreceptors of Example 2 and Control 2 showed a similar result. FIG. 2 demonstrates the same sharpening in the knee of the PIDC.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for preparing a dispersion suitable for use in applying a charge generating layer to a substrate, comprising:
   dissolving a polymeric film-forming product comprising vinyl chloride, vinyl acetate, a carboxylated monomer, and hydroxyalkyl acrylate in n-butyl acetate to form a solution;
   dispersing photoconductive phthalocyanine particles in said solution; and
   adding methyl isobutyl ketone to form a final dispersion having a solvent system comprising from about 40% by weight to about 95% by weight n-butyl acetate and from about 5% by weight to about 60% by weight methyl isobutyl ketone by weight of the solvent.

2. The process of claim 1, wherein said step of dissolving a polymeric-film-forming product is performed by dissolving the polymer comprising
   from about 80 percent to about 90 percent by weight of said vinyl chloride;
   from about 3 percent to about 15 percent by weight of said vinyl acetate;
   from about 6 percent to about 20 percent by weight of said hydroxyalkyl acrylate; and
   from about 0.2 percent to about 0.4 percent by weight of said carboxylated monomer, based on the total weight of said repeat units,
   in n-butyl acetate to form a solution.

3. The process of claim 1, wherein said step of dispersing photoconductive phthalocyanine particles in a solution is performed by dispersing photoconductive phthalocyanine particles selected from the group consisting of phthalocyanines consisting of hydroxygallium phthalocyanine, x metal-free phthalocyanine, oxotitanium phthalocyanine, chlorogallium phthalocyanine, oxovanadium phthalocyanine, and the polymorphs thereof.

4. The process of claim 1, wherein said step of adding said methyl isobutyl ketone to form a final dispersion is performed by adding methyl isobutyl ketone to form a final dispersion having a solvent system comprising from about 60-75% by weight n-butyl acetate and from about 25-40% by weight methyl isobutyl ketone by weight of the solvent.

5. The process of claim 1, further comprising the step of:
   milling said dispersion such that said phthalocyanine particles have an average diameter of from about 0.15 micrometers to about 0.3 micrometers.

6. The process of claim 1, wherein said carboxylated monomer is maleic acid.

7. A dispersion, comprising:
   a polymer matrix, said matrix comprising a polymeric film-forming product of vinyl chloride, vinyl acetate, maleic acid, and hydroxyalkyl acrylate;
   photoconductive phthalocyanine particles; and
   a solvent system comprising of from about 60 to about 75% by weight n-butyl acetate and from about 25 to about 40% by weight methyl isobutyl ketone by weight of the solvent.

8. The dispersion of claim 7, wherein said solvent system comprises from about 65% by weight n-butyl acetate and from about 35% by weight methyl isobutyl ketone by weight of the solvent.

9. The dispersion of claim 7, wherein said phthalocyanine particles are selected from the group consisting of hydroxygallium phthalocyanine, x metal-free phthalocyanine, oxotitanium phthalocyanine, chlorogallium phthalocyanine, vanadyl phthalocyanine, and the polymorphs thereof.

10. The dispersion of claim 7, wherein said polymer matrix comprises a polymeric film-forming reaction product of reactants comprising:
    from about 80 percent to about 90 percent by weight of said vinyl chloride;
    from about 3 percent to about 15 percent by weight of said vinyl acetate;
    from about 6 percent to about 20 percent by weight of said hydroxyalkyl acrylate; and
    from about 0.25 percent to about 0.38 percent by weight of said maleic acid, based on the total weight of said reactants.

11. An imaging member, comprising:
a substrate;
a charge generating layer; and
a charge transport layer;
wherein said charge generating layer is prepared by:
dispersing photoconductive phthalocyanine particles in a polymer matrix, the matrix comprising a polymeric film-forming reaction product of vinyl chloride, vinyl acetate, maleic acid, and hydroxyalkyl acrylate, in a solution of from about 40% by weight to about 95% by weight of n-butyl acetate and from about 5% by weight to about 60% by weight of methyl isobutyl ketone;
applying said dispersion to said substrate; and
drying said dispersion.

12. The electrophotographic imaging member of claim 11, wherein said charge generating layer comprises from about 40 percent by weight to about 75 percent by weight of said phthalocyanine particles based on the total weight of the charge generating layer.

13. The dispersion produced according to the process of claim 1.

14. The dispersion produced according to the process of claim 3.

15. The dispersion produced according to the process of claim 6.

16. The dispersion produced according to the process of claim 4.

* * * * *